Patented May 6, 1924.

1,493,247

UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

COATING COMPOSITION.

No Drawing. Application filed April 6, 1923. Serial No. 630,391.

*To all whom it may concern:*

Be it known that I, WHEELER P. DAVEY, a citizen of the United States, residing at Schenectady, in the county of Schenectady, State of New York, have made certain new and useful Improvements in Coating Compositions, of which the following is a specification.

The present invention relates to the manufacture of water japan, that is, a colloidal suspension in water of japan base. Its object is to produce a japan capable of assuming a semi-gloss or matte surface.

In my prior Patent 1,294,422 of February 18, 1919, I have described a water japan comprising asphaltic material such as gilsonite, and an oil or mixture of oils, such for example, as china wood oil, linseed oil, fish oil, etc., and in some cases a natural gum such as copal. My prior patent also describes as an occasional constituent a coloring matter such as bone black or lamp black in the japan. The latter materials are added when a semi-gloss or matte surface is desired. I have found that upon long standing a solid carbonaceous material, such as lamp black, tends to settle out of the water japan mixture.

In accordance with my present invention, I have found improved results may be obtained by adding to the japan mixture a water-soluble material, which is rich in carbon, such for example, as sugar which is decomposed at the baking temperature of the japan. The japan may be made as described in my prior patent by stirring a desired mixture of oil, asphaltic and other desired ingredients with a concentrated solution of either a soap or an alkali material capable of saponifying some of the oil in the japan, and heating to the softening point of the japan. Water is progressively added until the mixture has become emulsified at the temperature employed. At this point of the process an alkaline sugar solution is added which may be prepared as follows:— Ten parts by weight of sugar, and one part of sodium carbonate are added to ten parts of distilled water. This mixture is heated to about 100° C. for about ten minutes. For every two parts by weight of japan base, consisting as described above of asphalt and oil, about one part of this alkaline sugar solution is added while stirring. Finally enough water is added to produce a japan of desired consistency which will be a permanent or stable emulsion at room temperature.

This japan may be applied in the manner described in my prior patents, and set by baking at a temperature of about 150 to 250° C. The semi-matte appearance of the baked product appears to be due to a decomposition of the sugar at the baking temperature of the japan.

What I claim as new and desire to secure by Letters Patent of the United States, is:—

1. The combination of a suspension in water of a material which is capable of being set by heat and a material soluble in water which is capable at the setting temperature of said japan of furnishing by decomposition a product producing a matte surface.

2. A japan comprising a liquid menstruum, a material suspended or dissolved therein which is capable of being set by heat and a carbon-containing material which is soluble in said menstruum and is capable of being carbonized at the setting temperature of said japan.

3. A japan comprising a suspension in water of oleaginous and asphaltic material capable of being set by heating, and an organic material which is soluble in water, and decomposable at the said temperature of said japan, thereby causing the hardened japan film to assume a matte surface.

4. A coating composition comprising suspension in water of japan base and containing a quantity of sugar.

In witness whereof, I have hereunto set my hand this 5th day of April, 1923.

WHEELER P. DAVEY.